(12) United States Patent
Weflen

(10) Patent No.: US 10,655,434 B2
(45) Date of Patent: May 19, 2020

(54) SYSTEM AND METHOD FOR GENERATING ROTATIONAL POWER

(71) Applicant: Airtek Systems Inc., Edmonton (CA)

(72) Inventor: Darryl Weflen, Edmonton (CA)

(73) Assignee: Airtek Systems Inc., Edmonton, Alberta (CA)

( * ) Notice: Subject to any disclaimer, the term of this patent is extended or adjusted under 35 U.S.C. 154(b) by 512 days.

(21) Appl. No.: 15/486,195

(22) Filed: Apr. 12, 2017

(65) Prior Publication Data
US 2017/0292350 A1 Oct. 12, 2017

Related U.S. Application Data

(60) Provisional application No. 62/321,338, filed on Apr. 12, 2016.

(51) Int. Cl.
E21B 41/00 (2006.01)
F01L 1/02 (2006.01)
F02C 1/02 (2006.01)

(52) U.S. Cl.
CPC .......... *E21B 41/0085* (2013.01); *F01L 1/026* (2013.01); *F02C 1/02* (2013.01)

(58) Field of Classification Search
CPC .......... F01D 5/081; F02C 7/18; E21B 41/0085
See application file for complete search history.

(56) References Cited

U.S. PATENT DOCUMENTS

| | | | |
|---|---|---|---|
| 3,602,605 A * | 8/1971 | Lee | F01D 5/08 415/116 |
| 6,379,117 B1 * | 4/2002 | Ichiryu | F01D 5/081 416/96 R |
| 7,608,935 B2 | 10/2009 | Scherzer | |
| 7,683,499 B2 | 3/2010 | Saucier | |
| 7,958,716 B2 | 6/2011 | Ziegenfuss | |

* cited by examiner

*Primary Examiner* — Mark A Laurenzi
*Assistant Examiner* — Shafiq Mian
(74) *Attorney, Agent, or Firm* — Dentons US LLP

(57) ABSTRACT

A system and method is provided for converting wellhead pressure of natural gas wells, or for converting water head pressure of water towers, to rotational power for operating rotated equipment, such as electrical generators, electrical alternators, pumps, air compressors, and other rotated equipment.

25 Claims, 11 Drawing Sheets

SYSTEM AND METHOD FOR GENERATING ROTATIONAL POWER

CROSS-REFERENCE TO RELATED APPLICATIONS

This application claims priority of U.S. provisional patent application Ser. No. 62/321,338 filed Apr. 12, 2016, which is incorporated by reference into this application in its entirety.

TECHNICAL FIELD

The present disclosure is related to the field of generating rotational power from the wellhead pressure of natural gas wells or the head pressure of a water tower, in particular, powering turbines using high pressure gases from a natural gas wellhead, or water head pressure of a water tower, to drive the turbine coupled to a generator.

BACKGROUND

High pressure gases or fluids can be used to drive a turbine for power generation purposes. Turbine generators often use stream to drive turbine but any high pressure gas may be used to drive the turbine. Water contained by a dam can also drive turbines to power electrical generators. Passive pressurized sources can also be used to provide the means to drive the turbine. For example, high pressure natural gas wells can be used as a source of pressurized gas. Natural gas wells often require the pressure to be reduced in order to safely transport the natural gas. The potential energy stored in the pressure of the natural gas when it is reduced for transport is often unutilized.

It is, therefore, desirable to provide a system for generating rotational power using high pressure natural gas from a natural gas wellhead, or from water head pressure from a water tower, to operate rotated equipment such as turbines and the like to provide environmentally-friendly generated electricity from a source of energy that would otherwise be remain unutilized.

SUMMARY

A system and method is provided for generating rotational power using the wellhead pressure from a natural gas well or water head pressure from a water tower. In some embodiments, the system can comprise a turbine of novel design that can be used for non-combustible application. More particularly, the turbine can use high pressure natural gas from a gas well or head pressure from a water tower to drive the turbine coupled to an electrical generator and, thus, can generate electricity.

Broadly stated, in some embodiments, a system can be provided for generating rotational power from a gas well producing gas at a first pressure from a wellhead wherein the gas is processed to reduce the pressure of the gas to a second pressure before being transported on a main line from the gas well, the system comprising: a differential regulator operatively coupled to the wellhead, the differential regulator configured for receiving the gas from the wellhead at the first pressure and reducing the pressure of the gas to a third pressure, the third pressure being higher than the second pressure; and a turbine operatively coupled to the differential regulator, the turbine configured to receive the gas at the third pressure and to release the gas at the second pressure to the main line, the turbine further configured to rotate a rotor shaft as the gas passes through the turbine.

Broadly stated, in some embodiments, the system can further comprise rotated equipment operatively coupled to the rotor shaft.

Broadly stated, in some embodiments, the system can further comprise a speed reducer operatively coupling the rotor shaft to the rotated equipment via an output shaft, wherein the output shaft rotates at a slower rotational speed than the rotor shaft.

Broadly stated, in some embodiments, the system can further comprise a speed sensor configured for sensing rotational speed of one or both of the rotor shaft and the output shaft, the speed sensor operatively coupled to the differential regulator, wherein the sensed rotational speed is used in the control and operation of the differential regulator.

Broadly stated, in some embodiments, the system can further comprise a pressure sensor configured for sensing the pressure of the gas released by the turbine, the pressure sensor operatively coupled to the differential regulator, wherein the sensed pressure is used in the control and operation of the differential regulator.

Broadly stated, in some embodiments, the system can further comprise a gas scrubber operatively disposed between the differential regulator and the turbine, the gas scrubber configured to remove impurities from the gas before the gas is received by the turbine.

Broadly stated, in some embodiments, a method can be provided for generating rotational power from a gas well producing gas at a first pressure from a wellhead wherein the gas is processed to reduce the pressure of the gas to a second pressure before being transported on a main line from the gas well, the method comprising receiving the gas from the wellhead at the first pressure at a differential regulator, wherein the differential regulator is configured to reduce the pressure of the gas to a third pressure, the third pressure being higher than the second pressure; and passing the gas at the first pressure through a turbine operatively coupled to the differential regulator, the turbine configured to receive the gas at the third pressure and to release the gas at the second pressure to the main line, the turbine further configured to rotate a rotor shaft as the gas passes through the turbine.

Broadly stated, in some embodiments, the method can further comprise rotating rotated equipment operatively coupled to the rotor shaft.

Broadly stated, in some embodiments, the method can further comprise reducing rotational speed of the rotor shaft with a speed reducer, the speed reducer operatively coupling the rotor shaft to the rotated equipment via an output shaft, wherein the output shaft rotates at a slower rotational speed than the rotor shaft.

Broadly stated, in some embodiments, the method can further comprise sensing the rotational speed of one or both of the rotor shaft and the output shaft with a speed sensor, the speed sensor operatively coupled to the differential regulator, wherein the sensed rotational speed is used in the control and operation of the differential regulator.

Broadly stated, in some embodiments, the method can further comprise sensing the pressure of the gas released by the turbine, the pressure sensor operatively coupled to the differential regulator, wherein the sensed pressure is used in the control and operation of the differential regulator.

Broadly stated, in some embodiments, the method can further comprise scrubbing the gas of impurities before the gas is received by the turbine.

Broadly stated, in some embodiments, the turbine can comprise: a housing further comprising an inlet operatively coupled to the differential regulator and an outlet operatively coupled to the main line; a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring; a rotor disc rotatably disposed in the nozzle ring, the disc further comprising a plurality of rotor blades disposed substantially spaced equidistant apart around the rotor disc, the rotor blades substantially aligning with the nozzle openings; and a rotor shaft operatively coupled to the rotor disc, the rotor shaft configured to rotate when the gas at the third pressure enters the housing through inlet and passes through the nozzle openings to pass through the rotor blades and then exit through the outlet at the second pressure.

Broadly stated, in some embodiments, a turbine can be provided for generating rotational power from gas or fluid at a first pressure, the turbine comprising: a housing further comprising an inlet operatively configured for coupling to the gas or fluid, and further comprising an outlet; a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring; a rotor disc rotatably disposed in the nozzle ring, the disc further comprising a plurality of rotor blades disposed substantially spaced equidistant apart around the rotor disc, the rotor blades substantially aligning with the nozzle openings; and a rotor shaft operatively coupled to the rotor disc, the rotor shaft configured to rotate when the gas or fluid enters the housing through inlet and passes through the nozzle openings to pass through the rotor blades and then exit through the outlet at a second pressure, wherein the second pressure is less than the first pressure.

Broadly stated, in some embodiments, the turbine's nozzle openings can comprise an inlet opening and an outlet opening, the outlet opening smaller in diameter than the inlet opening.

Broadly stated, in some embodiments, the turbine can further comprise a differential regulator, wherein the differential regulator is configured to reduce the pressure of the gas or fluid to a third pressure, the third pressure being higher than the second pressure.

Broadly stated, in some embodiments, a system can be provided for generating rotational power from water released from a water tower, the water at a first pressure, the system comprising a turbine operatively coupled to the water tower and configured to receive the water at the first pressure and to release the water after passing therethrough to a main water line, the turbine further configured to rotate a rotor shaft as the water passes through the turbine.

Broadly stated, in some embodiments, the system can further comprise rotated equipment operatively coupled to the rotor shaft.

Broadly stated, in some embodiments, the rotated equipment can further comprise one or more of a group comprising a pump, an electrical generator, an electrical alternator and an air compressor.

Broadly stated, in some embodiments, the system can further comprise a speed reducer operatively coupling the rotor shaft to the rotated equipment via an output shaft, wherein the output shaft rotates at a slower rotational speed than the rotor shaft.

Broadly stated, in some embodiments, the speed reducer can further comprise a speed sensor configured for sensing rotational speed of one or both of the rotor shaft and the output shaft, the speed sensor operatively coupled to the pressure regulator, wherein the sensed rotational speed is used in the control and operation of the pressure regulator.

Broadly stated, in some embodiments, the system can further comprise a pressure sensor configured for sensing the third pressure, the pressure sensor operatively coupled to the pressure regulator, wherein the sensed pressure is used in the control and operation of the pressure regulator.

Broadly stated, in some embodiments, the system can further comprise a pressure sensor configured for sensing the third pressure, the pressure sensor operatively coupled to the pressure regulator, wherein the sensed pressure is used in the control and operation of the pressure regulator.

DETAILED DESCRIPTION OF EMBODIMENTS

Figure 1A:
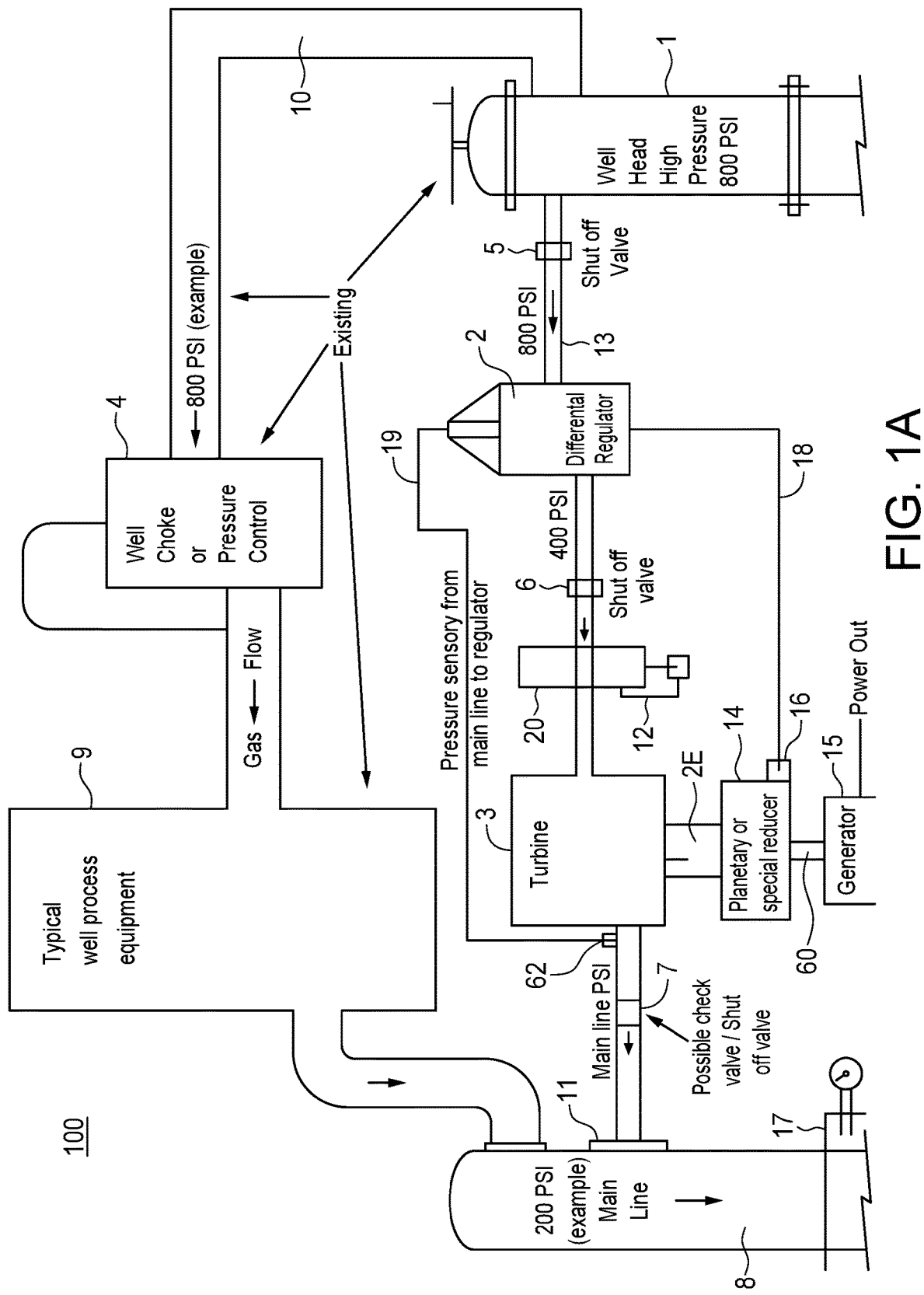
FIG. 1A is a block diagram depicting one embodiment of a turbine-powered electrical generator using high pressure natural gas from a natural gas wellhead.

A turbine-powered generator is provided. Referring to FIG. 1A, one embodiment of turbine-powered generator system 100 is shown. In this embodiment, system 100 can comprise wellhead 1 of a high-pressure natural gas well, which can have a wellhead pressure of several hundred or thousand pounds per square inch ("PSI"). In the illustrated example, the wellhead pressure at wellhead 1 is shown as 800 PSI. In a typical configuration, wellhead 1 is connected to choke valve 4, or some other pressure control device as well known to those skilled in the art, via pipe 10. Valve 4 lowers the wellhead gas pressure to a safe working pressure to be processed by well process equipment 9, as well known to those skilled in the art, before being released for transport on main gas line 8. In the illustrated example, the pressure of the natural gas is reduced to 200 PSI for transport in main line 8.

In some embodiments, system 100 adds the following components. A portion of the high pressure natural gas in wellhead 1 can be directed to differential regulator 2 via shut-off valve 5 and supply line 13. Differential regulator 2 can reduce the pressure of the natural gas to an intermediate pressure level, such as 400 PSI as shown in the illustrated example although is it obvious to those skilled in the art that the intermediate pressure level can be set higher or lower as needed. The intermediate pressure natural gas can be directed to turbine 3 via supply line 12. As the natural gas passes through turbine 3, the pressure of the natural gas can reduce to the transport pressure of natural gas in main line 8, which is 200 PSI in the illustrated example, via main line connection 11, which can further comprise check/shut-off valve 7 disposed thereon to connect and disconnect turbine 3 with main line 8.

In some embodiments, turbine 3 can be rotationally coupled to planetary gear set or speed reducer 14 that, in turn, can be rotationally coupled to electrical generator 15 that can further provide electrical power that can be used by electrical equipment located at the wellsite, be fed back to an electrical power grid (not shown) or both. In some embodiments, gas scrubber 20 can be disposed on supply line 12 wherein intermediate pressure natural gas can pass through gas scrubber 20 to remove impurities as well known to those skilled in the art, such as $H_2S$ from sour gas among other impurities, before passing through turbine 3.

In some embodiments, pressure sensor 62 can be installed on main line connection 11 so that the pressure of the natural gas in main line connection 11 can be relayed back to differential regulator 2 via sensor line 19, wherein the sensed pressure can be used by differential regulator 2 in the control and operation of differential regulator 2. In some embodiments, the pressure sensor can comprise an electrical, mechanical or electro-mechanical device, as well known to those skilled in the art, configured to provide a pressure control signal that is representative of the gas pressure within main line connection 11. The pressure control signal can be electrical, hydraulic, pneumatic, any other signal from pressure sensing mechanisms well known to those skilled in the art, or any combination thereof. In some embodiments, speed reducer 14 can further comprise speed sensor 16 disposed thereon and operatively connected to differential regulator 2 via speed sensor line 18, wherein the speed sensor reading can be used in the control and operation of differential regulator 2. In some embodiments, speed sensor 16 can comprise an electrical, mechanical or electro-mechanical device, as well known to those skilled in the art, configured to provide a speed control signal that is representative of the rotational speed of one or both of rotor shaft 2E and output driveshaft 60 of speed reducer 14. The speed control signal can be electrical, hydraulic, pneumatic, any other signal from speed sensing mechanisms well known to those skilled in the art, or any combination thereof.

Figure 1B:
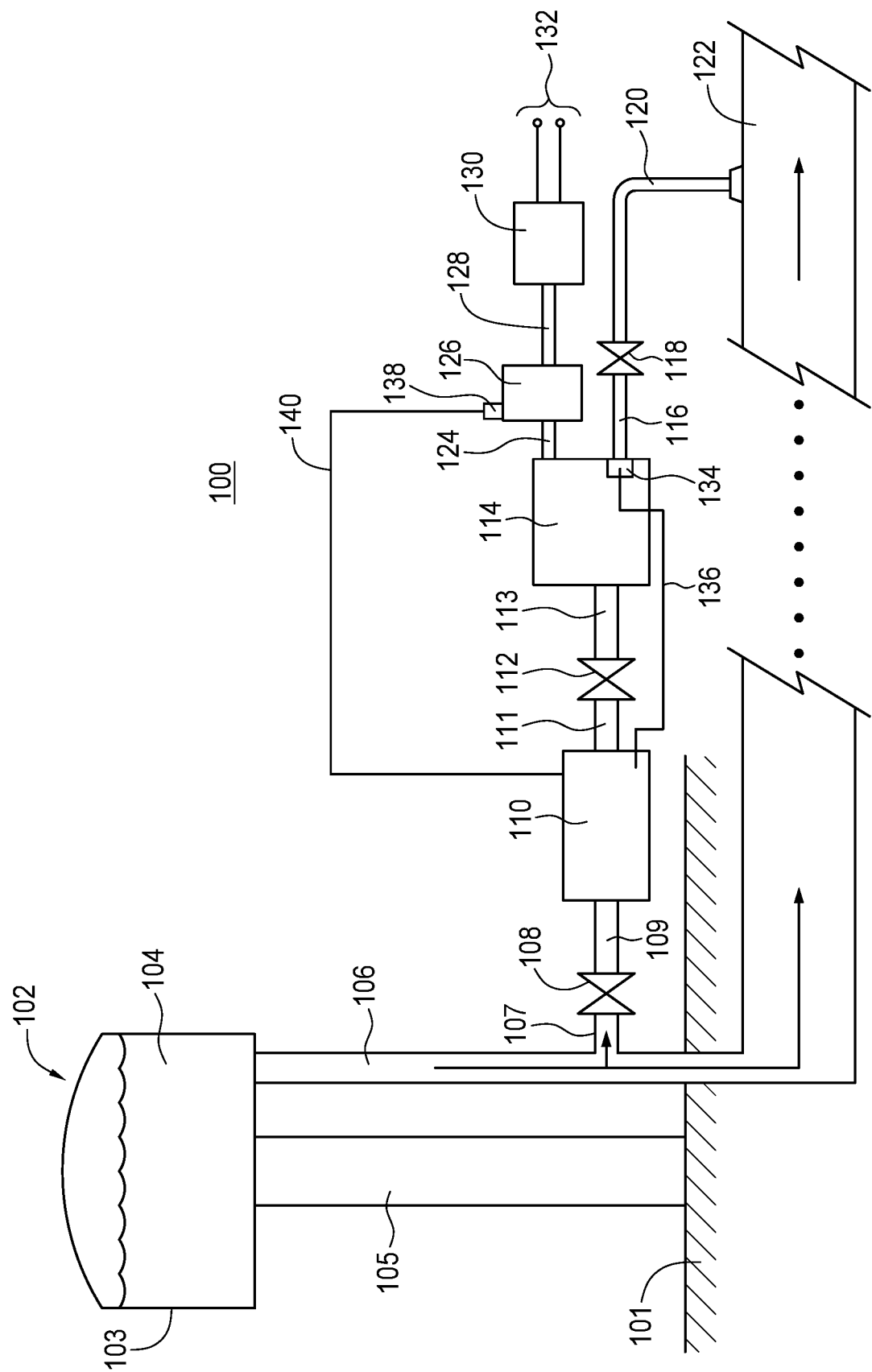
FIG. 1B is a block diagram depicting one embodiment of a turbine-powered electrical generator using water head pressure from a water tower.

Referring to FIG. 1B, a second embodiment of turbine-powered generator system 100 is shown. In this embodiment, system 100 can comprise water tower 102 further comprise of reservoir tank 103 mounted on pedestal 105, which be positioned a suitable distance above ground 101 to provide a source of pressurized supply water as well known to those skilled in the art, and wherein water 104 can be contained in tank 103. In a typical water tower supplying water to a community, the water pressure of water supplied at ground level by the water tower can range from 50 to 100 psi, depending on how many feet tank 103 is elevated above ground 101. In some embodiments, supply line 106 can connect tank 103 via tee 107 to cut-off valve 108 that, in turn, can connect to pressure regulator 110 via supply line 109. Regulator 110 can be used in some embodiments to lower or regulate water pressure to a useable pressure suitable for operating to water turbine 114. Water exiting regulator 110 can pass through supply line 111 to cut-off valve 112, and then pass through supply line 113 to turbine 114. Water exiting turbine 114 can pass through supply line 116 to cut-off valve 118 prior to passing through supply line 120 to main water supply 122. Cut-off valves 108, 112 and 118 can provide means for controlling the flow of water through system 100.

In some embodiments, turbine 114 can be rotationally coupled to planetary gear set or speed reducer 126 via rotor shaft 124. Speed reducer 126 can then, in turn, can be rotationally coupled to electrical generator 130 via output shaft 128 that can further provide electrical power on electrical power leads 132 that can be used by electrical equipment located at the wellsite, be fed back to an electrical power grid (not shown) or both.

In some embodiments, pressure sensor 134 can be installed on supply line 116 so that the pressure of the water in supply line 116 can be relayed back to pressure regulator 110 via sensor line 136, wherein the sensed pressure can be used by pressure regulator 110 in the control and operation of pressure regulator 110. In some embodiments, pressure sensor 134 can comprise an electrical, mechanical or electro-mechanical device, as well known to those skilled in the art, configured to provide a pressure control signal that is representative of the water pressure within supply line 116. The pressure control signal can be electrical, hydraulic, pneumatic, any other signal from pressure sensing mechanisms well known to those skilled in the art, or any combination thereof. In some embodiments, speed reducer 126 can further comprise speed sensor 138 disposed thereon and operatively connected to pressure regulator 110 via speed sensor line 140, wherein the speed sensor reading can be used in the control and operation of pressure regulator 110. In some embodiments, speed sensor 138 can comprise an electrical, mechanical or electro-mechanical device, as well known to those skilled in the art, configured to provide a speed control signal that is representative of the rotational speed of one or both of rotor shaft 124 and output shaft 128 of speed reducer 126. The speed control signal can be electrical, hydraulic, pneumatic, any other signal from speed sensing mechanisms well known to those skilled in the art, or any combination thereof.

Figure 1C:
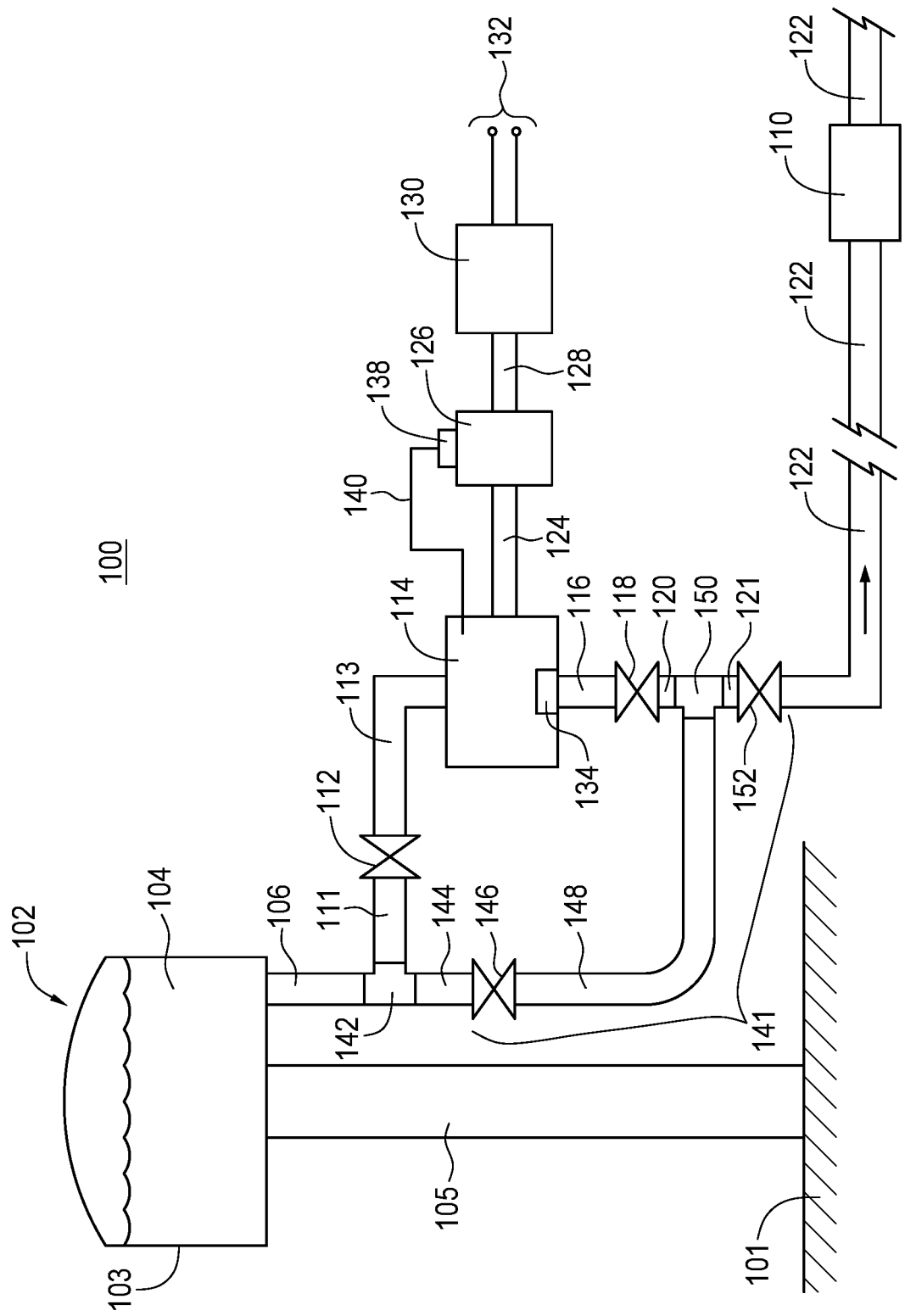
FIG. 1C is a block diagram depicting a second embodiment of a turbine-powered electrical generator using water head pressure from a water tower.

Referring to FIG. 1C, another embodiment of turbine-powered generator system 100 is shown. In this embodiment, system 100 can comprise water tower 102 further comprise of reservoir tank 103 mounted on pedestal 105, which be positioned a suitable distance above ground 101 to provide a source of pressurized supply water as well known to those skilled in the art, and wherein water 104 can be contained in tank 103. In a typical water tower supplying water to a community, the water pressure of water supplied at ground level by the water tower can range from 50 to 100 psi, depending on how many feet tank 103 is elevated above ground 101. In some embodiments, turbine 114 can act as a pressure regulator, similar to pressure regular 110 shown in FIG. 1B. In some embodiments, system 100 can comprise bypass line 141, which can comprise of tee 143, line 144, cut-off valve 146, line 148 and tee 150 that can enable the ability to bypass turbine 114 to enable the ability to service system 100 and still maintain water flow to main water supply 122. In some embodiments, main water supply 122 can comprise pressure regulator 110 downstream of system 100 to regulate the main water supply pressure, as required and as determined by those skilled in the art.

In some embodiments, supply line 106 can connect tank 103 to turbine 114 via tee 142, supply line 111, cut-off valve 112 and supply line 113. Water exiting turbine 114 can pass through supply line 116 to cut-off valve 118 prior to passing through supply line 120 to main water supply 122 via tee 150, supply line 121 and cut-off valve 152 of bypass line 141.

In some embodiments, turbine 114 can be rotationally coupled to planetary gear set or speed reducer 126 via rotor shaft 124. Speed reducer 126 can then, in turn, can be rotationally coupled to electrical generator 130 via output shaft 128 that can further provide electrical power on electrical power leads 132 that can be used by electrical equipment located at the wellsite, be fed back to an electrical power grid (not shown) or both.

In some embodiments, pressure sensor 134 can be installed on supply line 116 so that the pressure of the water in supply line 116 can be used by turbine 114 in the control and operation of turbine 114. In some embodiments, pressure sensor 134 can comprise an electrical, mechanical or electro-mechanical device, as well known to those skilled in the art, configured to provide a pressure control signal that is representative of the water pressure within supply line 116. The pressure control signal can be electrical, hydraulic, pneumatic, any other signal from pressure sensing mechanisms well known to those skilled in the art, or any combination thereof. In some embodiments, speed reducer 126 can further comprise speed sensor 138 disposed thereon and operatively connected to turbine 114 via speed sensor line 140, wherein the speed sensor reading can be used in the control and operation of turbine 114. In some embodiments, speed sensor 138 can comprise an electrical, mechanical or electro-mechanical device, as well known to those skilled in the art, configured to provide a speed control signal that is representative of the rotational speed of one or both of rotor shaft 124 and output shaft 128 of speed reducer 126. The speed control signal can be electrical, hydraulic, pneumatic, any other signal from speed sensing mechanisms well known to those skilled in the art, or any combination thereof.

Figure 2:
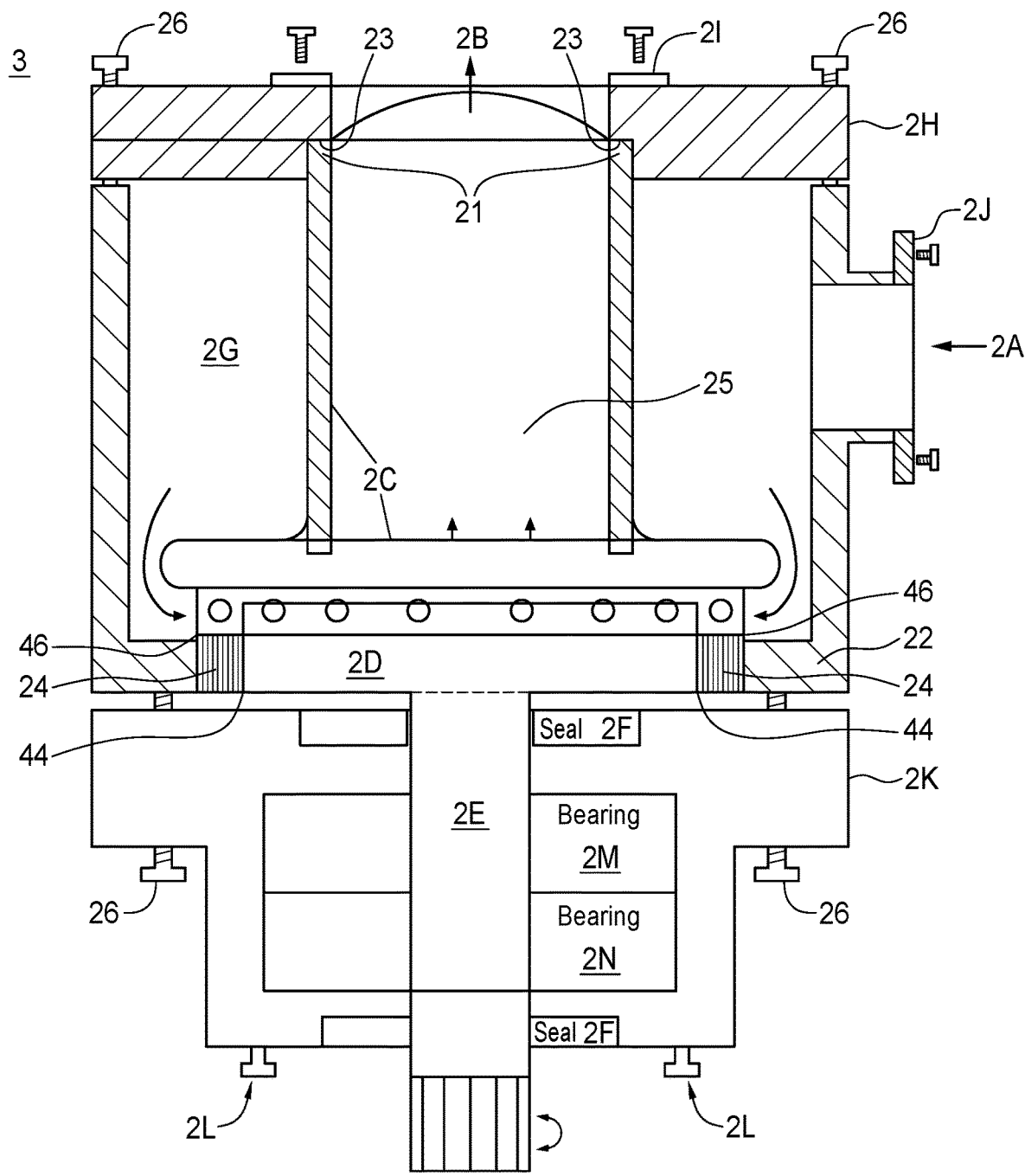
FIG. 2 is a side cross-section view depicting the turbine of FIG. 1A.
Figure 3:
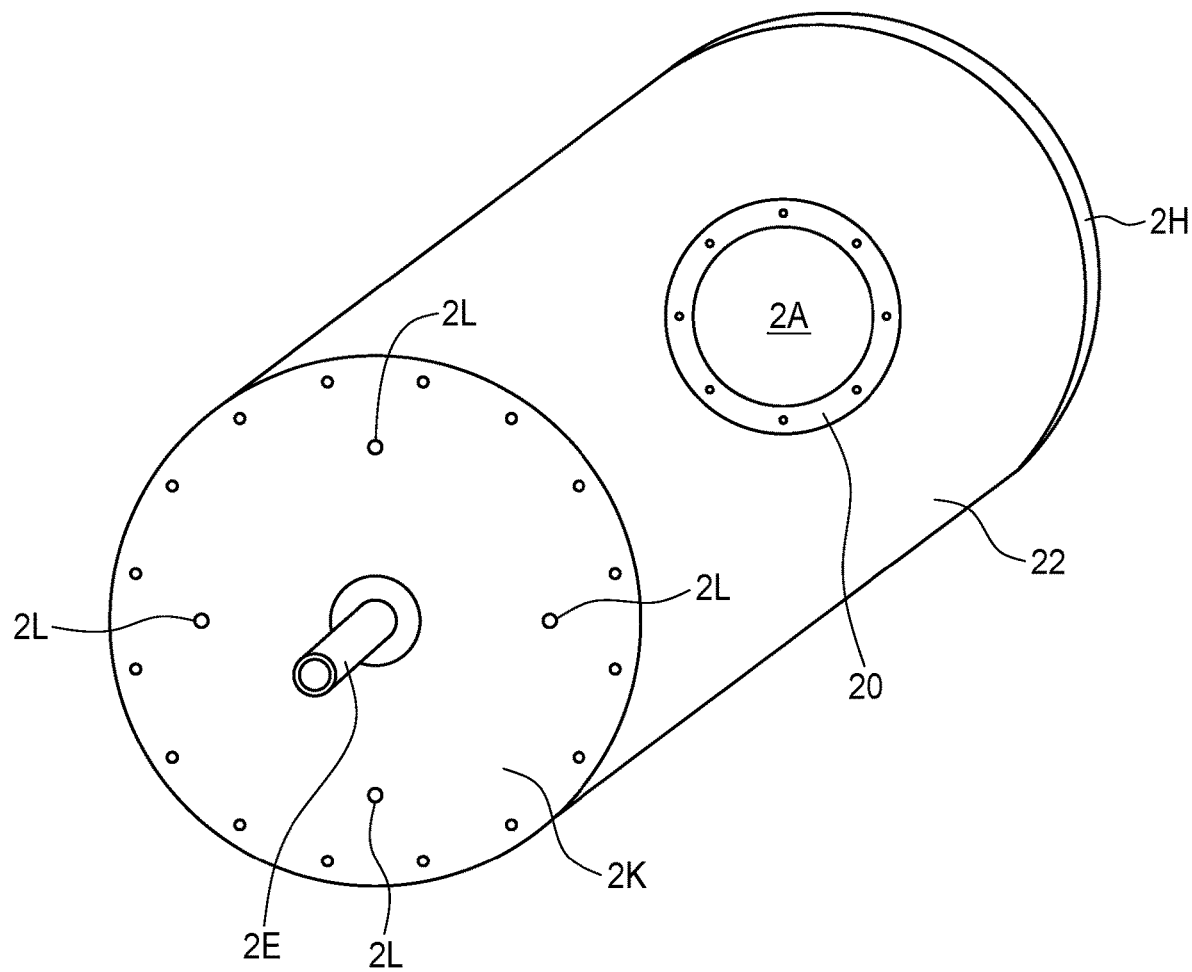
FIG. 3 is a perspective view depicting a turbine enclosure for the turbine of FIG. 1A.
Figure 4:
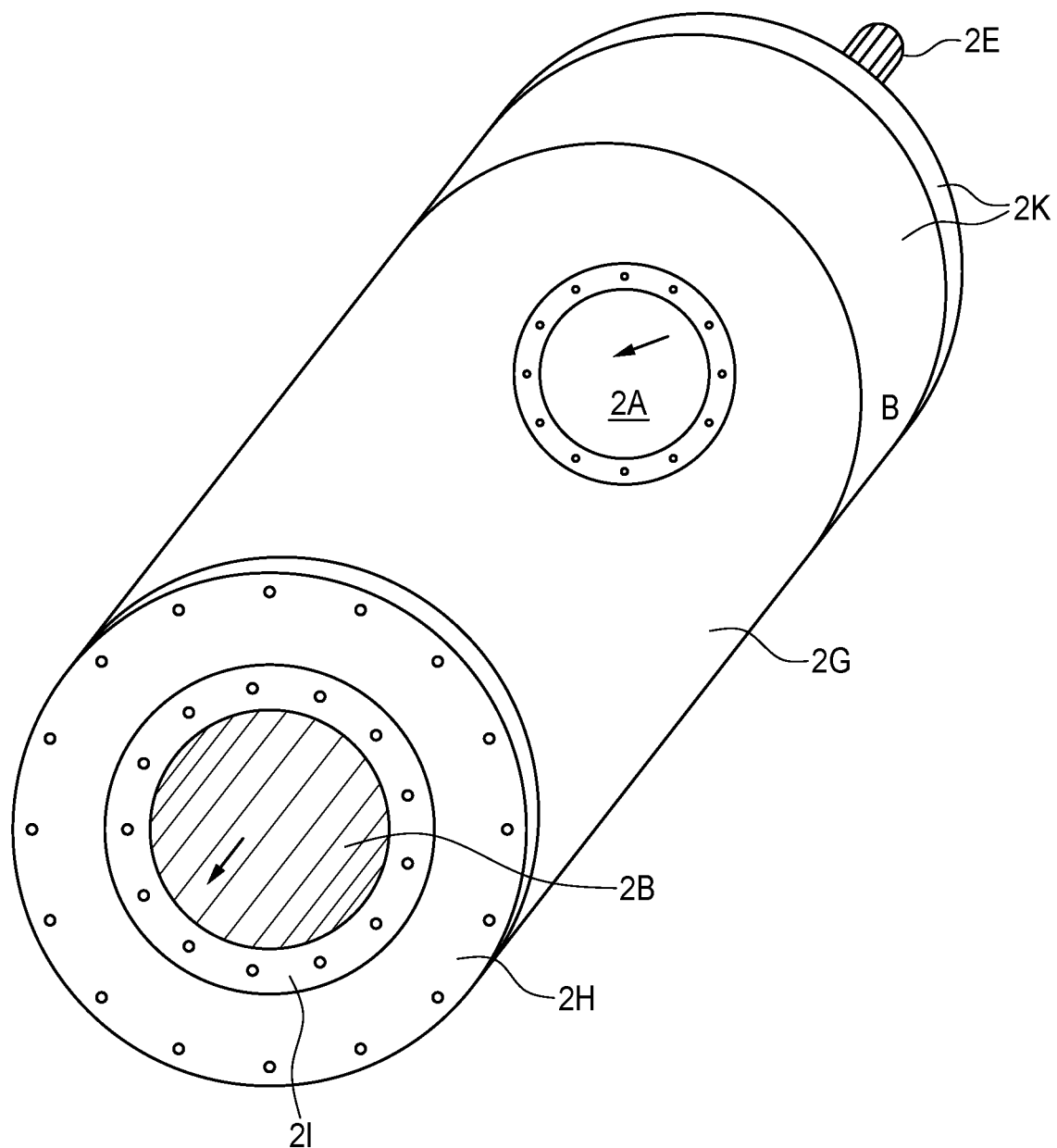
FIG. 4 is a perspective view depicting the exhaust port of the turbine enclosure of FIG. 3.
Figure 5:
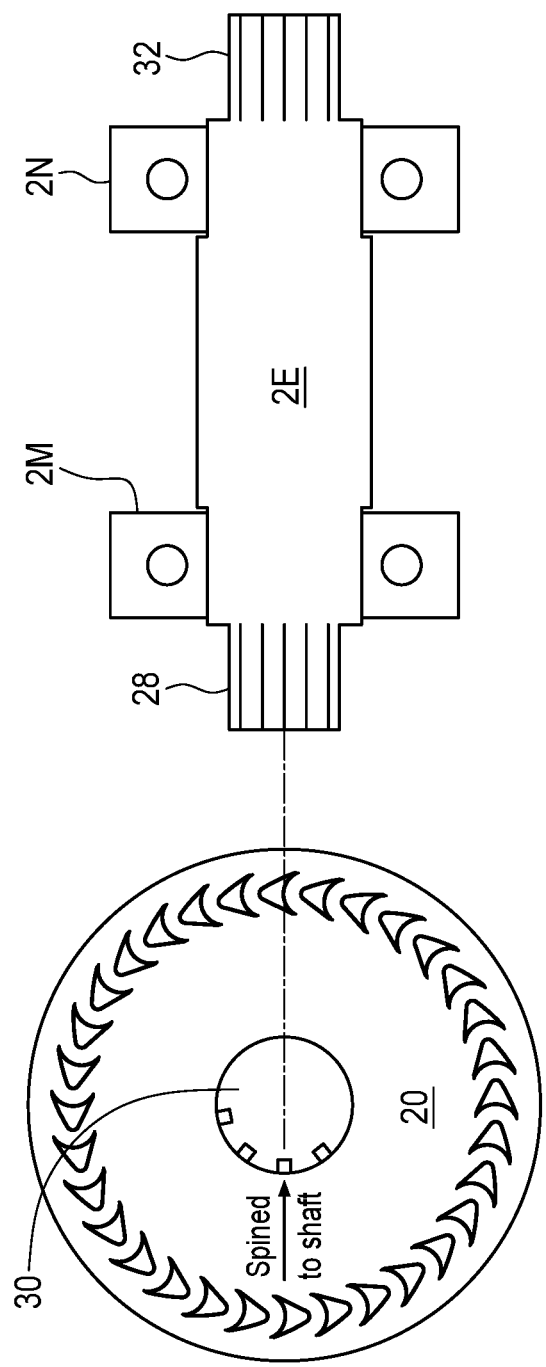
FIG. 5 is a side elevation view depicting a rotor disc and a rotor shaft of the turbine of FIG. 1A.
Figure 6A:
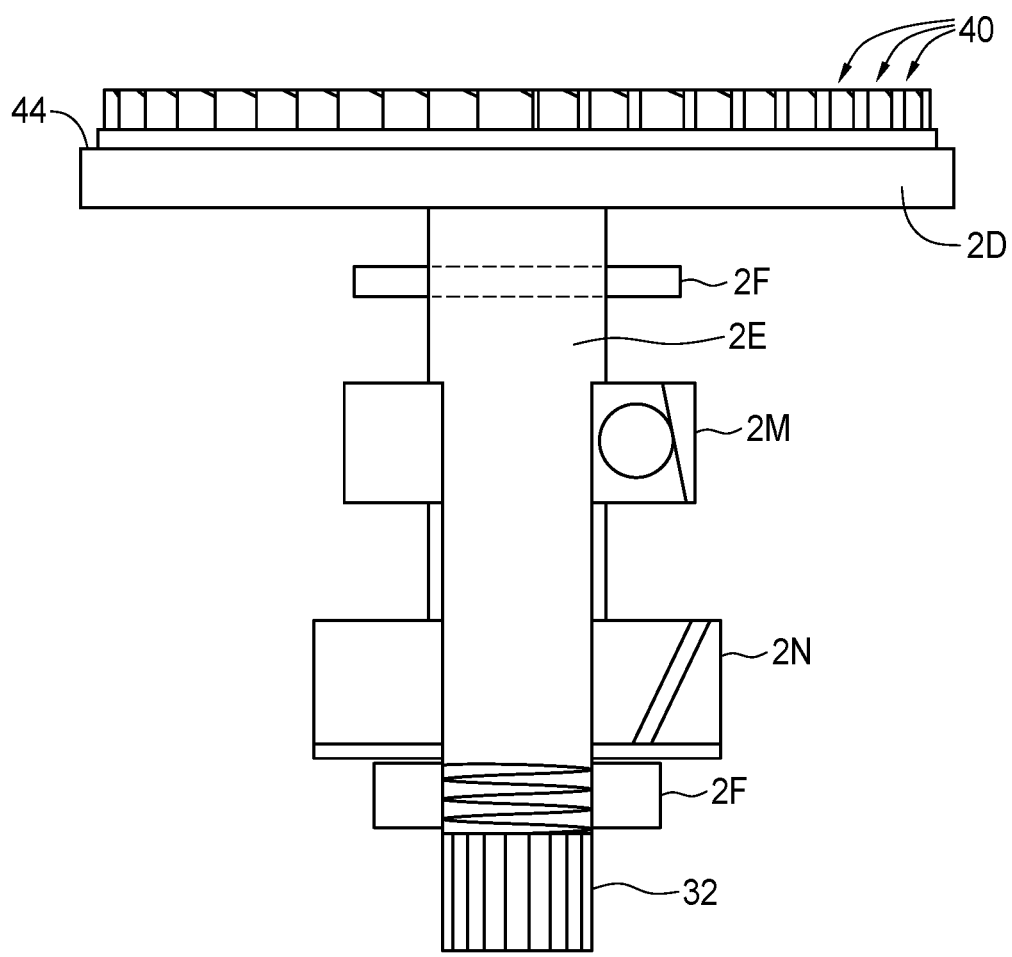
FIG. 6A is a side elevation view depicting of the rotor shaft attached to the rotor disc of FIG. 5.
Figure 6B:
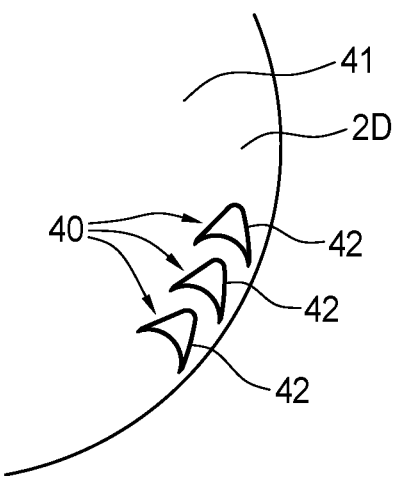
FIG. 6B is a top plan section depicting the rotor disc of FIG. 6A.

Referring to FIGS. 2 through to 8, one embodiment of turbine 3 is shown. In some embodiments, turbine 3 can comprise housing 22 disposed around nozzle ring 2C operatively coupled to rotor 2D, wherein rotor 2D can be rotatably coupled to housing 22 via thrust bearing 24. In some embodiments, turbine 3 can comprise end plate 2H attached to housing 22 via fasteners 26 to form annular expansion chamber 2G disposed around nozzle ring 2C inside housing 22. End 21 of nozzle ring 2C can be disposed in opening 23 disposed on the inside surface of end plate 2H. Bottom edge 46 of nozzle ring 2C can contact an upper surface of thrust bearing 24, wherein ledge 44 of rotor disc 2D can contact a lower surface of thrust bearing 24.

In some embodiments, rotor 2D can comprise rotor shaft 2E extending substantially perpendicular therefrom. In some embodiments, turbine 3 can comprise bearing support 2K coupled to housing 22 via fasteners 26. Bearing support 2K can comprise bearings 2M and 2N disposed therein to support shaft 2E. Bearing support 2K can further comprise shaft seals 2F disposed on either side of the bearings as a means to prevent pressurized escaping from housing 22. Housing 22 can further comprise inlet flange 2J formed around inlet 2A as a means for coupling to supply line 13. Housing 22 can further comprise outlet flange 2I formed around outlet 2B as a means for coupling to main line connection 11. In some embodiments, bearing support 2K can be fashioned so as to form mounting points 2L for accessory equipment to be driven by shaft 2E, such as speed reducer 14 or other items requiring a rotational power input such as a pump, an electrical generator, an electrical alternator, an air compressor or other rotating equipment.

In some embodiments, housing 22 can be of simple design as a welded or cast structure of suitable material and will provide a method of attaching pressure inlet 2A and outlet 2B to system 100. In operation, pressurized gas from wellhead 1 can enter inlet 2A of turbine 3 and into expansion chamber 2G. From here, pressurized gas can pass through openings 36 disposed through nozzle ring 2C to flow through adjacent rotor blades 40 disposed on rotor disc 2D and into interior chamber 25 before exiting out through outlet 2B. Gas flowing between adjacent rotor blades 40 can cause rotor disc 2D to rotate and, thus, rotor shaft 2E. The rotation of shaft 2E can then operate electrical generator 15 via speed reducer 14.

Referring to FIGS. 5 to 8, one embodiment of rotor disc 2D is shown. In some embodiments, rotor disc 2D can comprise splined opening 30 configured for receiving splined end 28 of rotor shaft 2E. In other embodiments, disc 2D and shaft 2E could be cast or machined to incorporate the shaft and disc as one piece. In some embodiments, rotor disc 2D can comprise a plurality of shaped fins 40 disposed circumferentially around on surface 41 of rotor disc 2D, wherein outside surfaces 42 of adjacent fins 40 can be spaced 0.125" apart.

Figure 7:
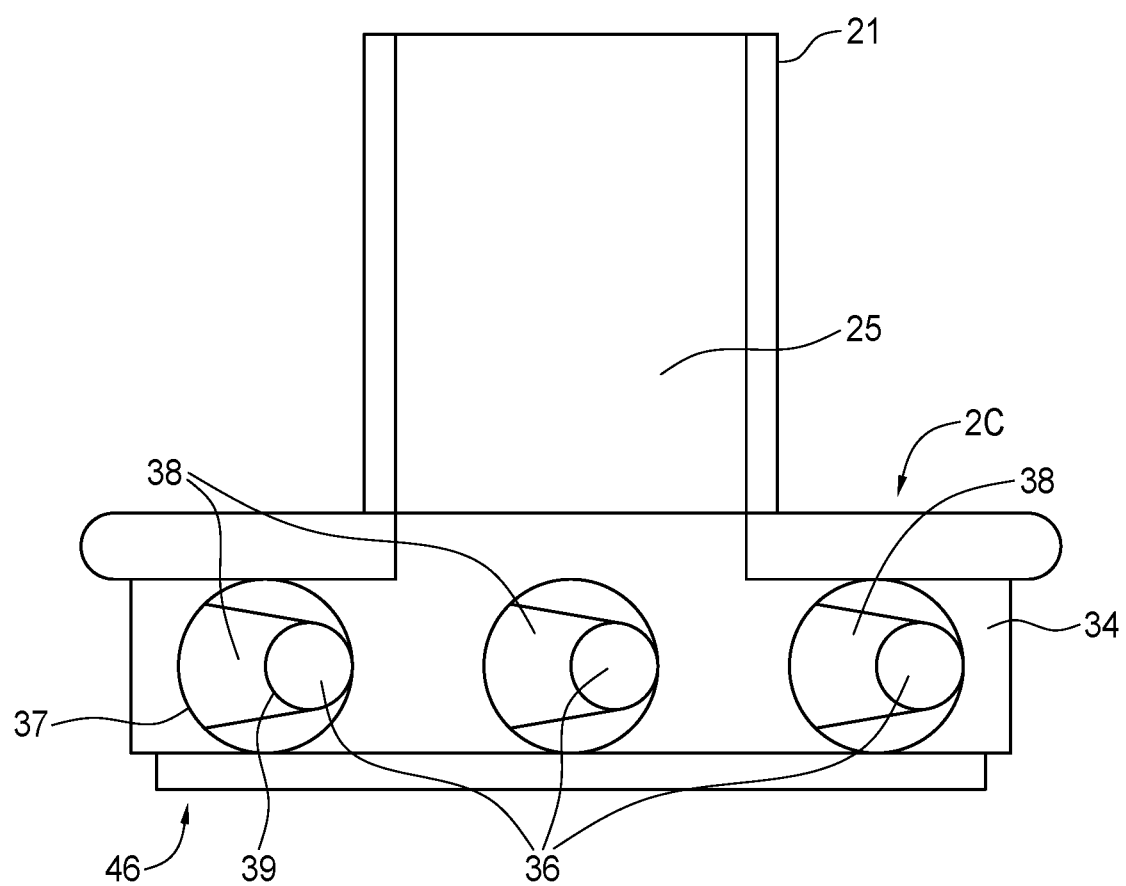
FIG. 7 is a side elevation view depicting a nozzle ring rotor shaft attached to the rotor disc of FIGS. 5 and 6A.
Figure 8:
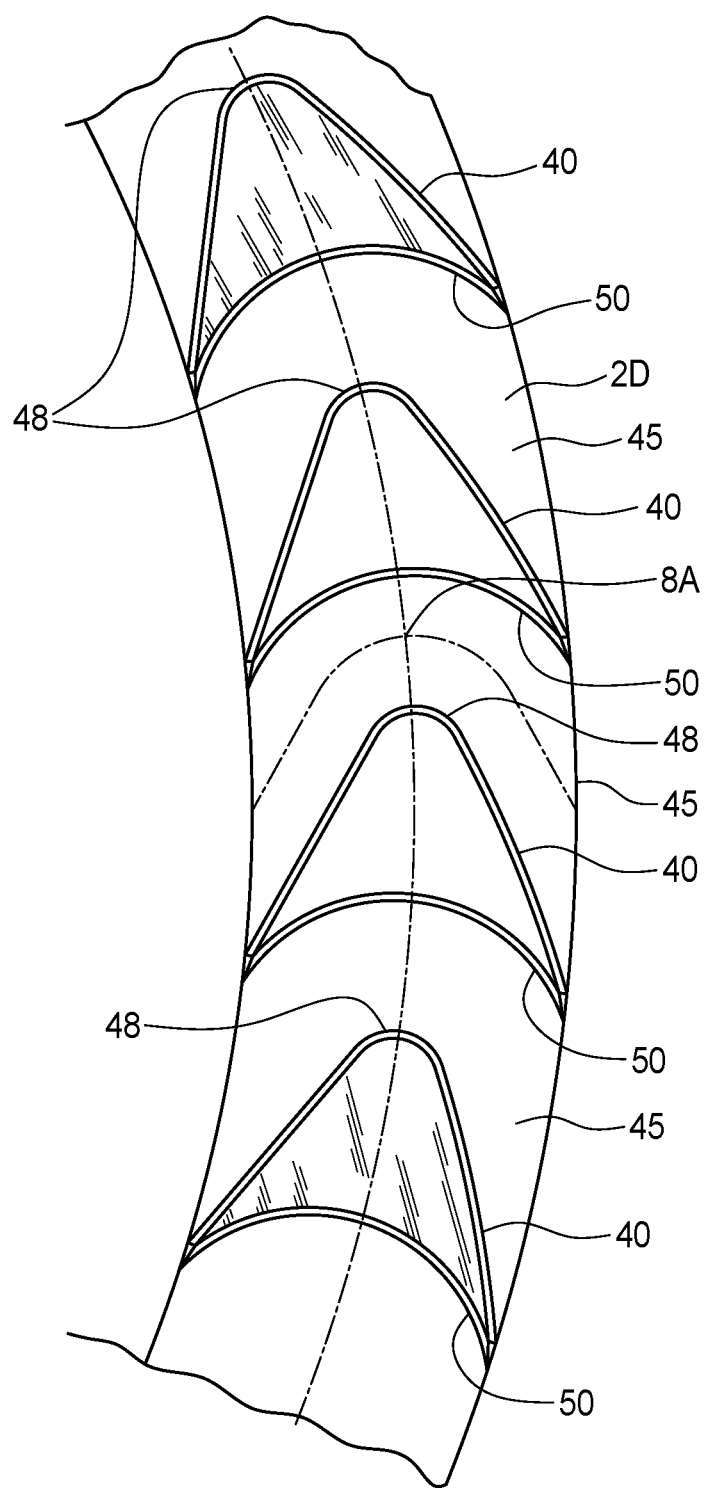
FIG. 8 is a top plan enlarged view depicting a section of the rotor blades deposed on the rotor disc of FIG. 6B.

Referring to FIG. 7, one embodiment of nozzle ring 2C is shown. In some embodiments, nozzle ring 2C can comprise a plurality of nozzle openings 36 disposed through sidewall 34, wherein openings 36 can be spaced substantially equidistant apart around a circumference of nozzle ring 2C. Nozzle ring 2C can be constructed as a casting, or can be easily machined from a variety of materials. In some embodiments, each opening 36 can comprise sloped sidewall 38 to impart a tangential trajectory, with respect to rotor disc 2D, for pressurized gas flowing therethrough. This design can increase the efficiency of turbine rotor disc 2D, with the pressure (force) of gas or fluid passing through openings 36. Sloped sidewalls 38 direct incoming gas or fluid pressure onto rotor blades 40 at equally spaced intervals. In some embodiments, a ratio of 2:1 or 2 rotor blades 40 per nozzle opening 36 has proven satisfactory but other combinations can also be possible.

Nozzle ring assembly 2C can be cast or machined from a variety of materials. The nozzle to rotor blade angle can be such that gas pressure exiting nozzle opening 36 can be directed optimally onto the surface of rotor blades 40 of rotor disc 2D. In some embodiments, the diameter of nozzle opening 36 can narrow or taper in diameter such that outlet opening 39 is less than inlet opening 37. This can enable concentrating, aligning and/or focusing the gas flow optimally towards rotor blades 40 to maximize the amount of gas flowing through rotor blades 40.

In some embodiments, the design of rotor blades 40 can be configured such that as the pressurized gas passes through the adjacent rotor blades 40, the gas can enter mouth 45 and compress or converge at centre 8A of the blade radius between concave side 50 of a leading rotor blade 40 and convex peak 48 on the trailing side of the following rotor blade 40, and can then allow the gas to expand as it passes peak 48, thus speeding its discharge into chamber 25 and can further increase the power exerted on rotor disc 2D versus standard rotor designs, as the gas or fluid pressure exiting rotor blades 40 can be turned or directed to the centre of rotor disc 2D, and can further exit through the centre of nozzle ring 2C and outlet 2B where it can be exhausted or redirected into a lower pressure area to recover energy.

Figure 9:
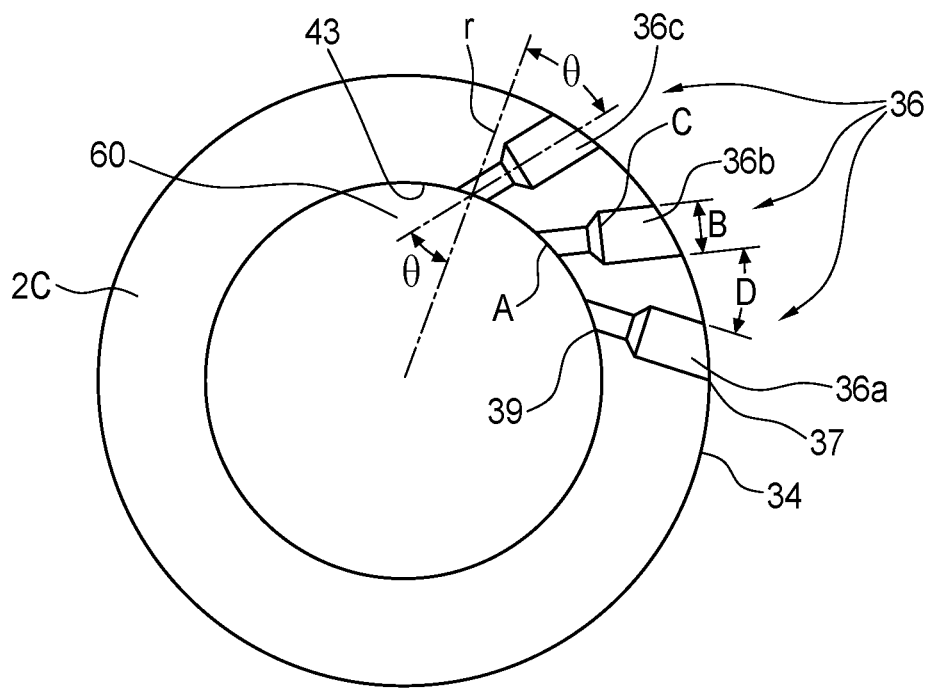
FIG. 9 is a top plan view depicting one embodiment of the nozzle ring of FIG. 7.

Referring to FIG. 9, one embodiment of nozzle ring 2C is shown. In some embodiments, axis 60 of one or more nozzle 36 can be angled relative to radius r of nozzle ring 2C, as illustrated by angle Θ. In the illustrated embodiment where there are 16 nozzles 36 disposed in nozzle ring 2C, Θ can be 22.5°. Correspondingly, angle D between adjacent nozzles 36 can also be 22.5°, as shown between nozzles 36a and 36b. The number of nozzles 36 is a function of the size of nozzle ring 2C. In the illustrated embodiment, nozzle ring 2C is sized such that its internal diameter is dimensioned to accommodate a rotor disc 2D having a diameter of 3 inches and, thus, can accommodate up to 16 nozzles 36. As the diameter of rotor disc 2D is increased or decreased, so can the number of nozzles 36 can increase or decrease, as can be determined by one skilled in the art. Correspondingly, as the diameter of rotor disc 2D is increased or decreased, so can the number of rotor blades 40 can increase or decrease, and can further maintain the ratio of two rotor blades 40 per nozzle 36 although in some embodiments, this ratio can also increase or decrease, as determined by the size of rotor blades 40 and the diameter of nozzle ring 2C.

In some embodiments, inlet 37 can have a large diameter than outlet 39, with narrowing transition C disposed therebetween. In the illustrated embodiment, inlet 37, also shown as "B", can have a diameter of 0.3125 inches. Correspondingly, outlet 39, also shown as "A", can have a diameter of 0.180 inches. Narrowing transition C can comprise a chamfer angle of 30°.

Figure 10:
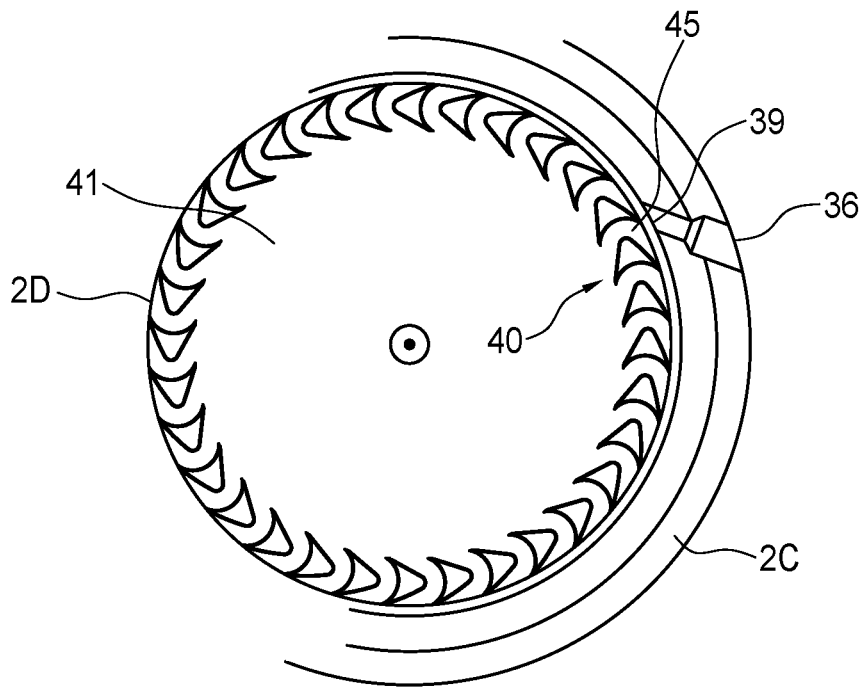
FIG. 10 is a top plan view depicting the rotor disc of FIG. 8 disposed in the nozzle ring of FIG. 9.

Referring to FIG. 10, the arrangement of nozzle 36 as shown in FIG. 9, and as described above, is shown with rotor disc 2D disposed therein to illustrate how nozzle 36 can align with rotor blades 40, in particular, how outlet 39 can align with mouth 45 between adjacent rotor blades 40.

In the embodiments described herein, it is envisioned that the systems and methods can be used with high-pressure gas off a gas well head for operating rotated equipment. It is also envisioned that the systems and methods described herein can be used with pressurized fluids, one example being using pressurized water from a water pipeline, or from a head or stand of water (such as a water tower or a flow of falling water), to provide the energy required to operate a turbine coupled to rotated equipment such as an electrical generator for generating electricity as but one example of an alternate application of the systems and methods described herein.

In some embodiments, it is envisioned that the systems and methods described herein can be used in large facilities such as bottling plants or processing plants having a pressurized water supply as an input to processes carried out in those plants to provide a localized supply of power derived from the water supply driving the turbine. In some embodiments, the systems and methods described herein can be suitable for such plants having pressurized water supplied thereto in water main pipes having a diameter of 12 inches and under. The design of the turbine in these situations can provide an efficient design makes it feasible in small scale applications of the systems and methods described herein.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A turbine for generating rotational power from gas or fluid at a first pressure, the turbine comprising:
    a housing further comprising an inlet operatively configured for coupling to the gas or fluid, and further comprising an outlet;
    a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring;
    a rotor disc rotatably disposed in the nozzle ring, the disc further comprising a plurality of rotor blades disposed substantially spaced equidistant apart around the rotor disc, the rotor blades substantially aligning with the nozzle openings; and
    a rotor shaft operatively coupled to the rotor disc, the rotor shaft configured to rotate when the gas or fluid enters the housing through the inlet and passes through the nozzle openings to pass through the rotor blades and then exit through the outlet at a second pressure, wherein the second pressure is less than the first pressure.

2. The turbine as set forth in claim 1, wherein the nozzle opening comprises an
    inlet opening and an outlet opening, the outlet opening smaller in diameter than the inlet opening.

3. The turbine as set forth in claim 1, further comprising a differential regulator, wherein the differential regulator is configured to reduce the pressure of the gas or fluid at the first pressure to an intermediate pressure, the intermediate pressure being higher than the second pressure.

4. The turbine as set forth in claim 2, further comprising a differential regulator, wherein the differential regulator is configured to reduce the pressure of the gas or fluid at the first pressure to an intermediate pressure, the intermediate pressure being higher than the second pressure.

5. A system for generating rotational power from a gas well producing gas at a first pressure from a wellhead wherein the gas is processed to reduce the pressure of the gas to a second pressure before being transported on a main line from the gas well, the system comprising:
    a differential regulator operatively coupled to the wellhead, the differential regulator configured for receiving the gas from the wellhead at the first pressure and reducing the pressure of the gas to a third pressure, the third pressure being higher than the second pressure; and
    a turbine operatively coupled to the differential regulator, the turbine configured to receive the gas at the third pressure and to release the gas at the second pressure to the main line, the turbine further configured to rotate a rotor shaft as the gas passes through the turbine, wherein the turbine comprises:
        a housing further comprising an inlet operatively coupled to the differential regulator and an outlet operatively coupled to the main line,
        a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring, a rotor disc rotatably disposed in the nozzle ring, the disc further comprising a plurality of rotor blades disposed substantially spaced equidistant apart around the rotor disc, the rotor blades substantially aligning with the nozzle openings, and a rotor shaft operatively coupled to the rotor disc, the rotor shaft configured to rotate when the gas at the third pressure enters the housing through inlet and passes through the nozzle openings to pass through the rotor blades and then exit through the outlet at the second pressure.

6. The system as set forth in claim 5, wherein the nozzle opening comprises an inlet opening and an outlet opening, the outlet opening smaller in diameter than the inlet opening.

7. The system as set forth in claim 6, further comprising rotated equipment operatively coupled to the rotor shaft.

8. The system as set forth in claim 7, wherein the rotated equipment comprises one or more of a group comprising a pump, an electrical generator, an electrical alternator and an air compressor.

9. The system as set forth in claim 7, further comprising a speed reducer operatively coupling the rotor shaft to the rotated equipment via an output shaft, wherein the output shaft rotates at a slower rotational speed than the rotor shaft.

10. The system as set forth in claim 9, wherein the speed reducer further comprises a speed sensor configured for sensing rotational speed of one or both of the rotor shaft and the output shaft, the speed sensor operatively coupled to the differential regulator, wherein the sensed rotational speed is used in the control and operation of the differential regulator.

11. A method for generating rotational power from a gas well producing gas at a first pressure from a wellhead wherein the gas is processed to reduce the pressure of the gas to a second pressure before being transported on a main line from the gas well, the method comprising:

receiving the gas from the wellhead at the first pressure at a differential regulator, wherein the differential regulator is configured to reduce the pressure of the gas to a third pressure, the third pressure being higher than the second pressure; and passing the gas at the first pressure through a turbine operatively coupled to the differential regulator, the turbine configured to receive the gas at the third pressure and to release the gas at the second pressure to the main line, the turbine further configured to rotate a rotor shaft as the gas passes through the turbine, wherein the turbine comprises:

a housing further comprising an inlet operatively coupled to the differential regulator and an outlet operatively coupled to the main line, a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring, a rotor disc rotatably disposed in the nozzle ring, the disc further comprising a plurality of rotor blades disposed substantially spaced equidistant apart around the rotor disc, the rotor blades substantially aligning with the nozzle openings, and a rotor shaft operatively coupled to the rotor disc, the rotor shaft configured to rotate when the gas at the third pressure enters the housing through inlet and passes through the nozzle openings to pass through the rotor blades and then exit through the outlet at the second pressure.

12. The method as set forth in claim 11, wherein the nozzle opening comprises an inlet opening and an outlet opening, the outlet opening smaller in diameter than the inlet opening.

13. The method as set forth in claim 12, further comprising rotating rotated equipment operatively coupled to the rotor shaft.

14. The method as set forth in claim 13, wherein rotating the rotated equipment comprises rotating one or more of a group comprising a pump, an electrical generator, an electrical alternator and an air compressor.

15. The method as set forth in claim 13, further comprising reducing rotational speed of the rotor shaft with a speed reducer, the speed reducer operatively coupling the rotor shaft to the rotated equipment via an output shaft, wherein the output shaft rotates at a slower rotational speed than the rotor shaft.

16. The method as set forth in claim 15, further comprising sensing the rotational speed of one or both of the rotor shaft and the output shaft with a speed sensor and controlling operation of the differential regulator using the sensed rotational speed.

17. The method as set forth in claim 11, further comprising sensing the pressure of the gas released by the turbine, and controlling operation of the differential regulator using the sensed pressure.

18. The method as set forth in claim 11, further comprising scrubbing the gas of impurities before the gas is received by the turbine.

19. A system for generating rotational power from water released from a water tower, the water at a first pressure, the system comprising a turbine operatively coupled to the water tower and configured to receive the water at the first pressure and to release the water after passing therethrough to a main water line, the turbine further configured to rotate a rotor shaft as the water passes through the turbine, wherein the turbine comprises:

a housing further comprising an inlet operatively configured for coupling to the water at the first pressure, and further comprising an outlet operatively configured for coupling to the main water line;

a nozzle ring disposed within the housing thereby forming an annular expansion chamber between the housing and the nozzle ring, the nozzle ring further comprising a plurality of nozzle openings disposed through the nozzle ring, the plurality of nozzle openings spaced substantially equidistant apart around a circumference of the nozzle ring;

a rotor disc rotatably disposed in the nozzle ring, the disc further comprising a plurality of rotor blades disposed substantially spaced equidistant apart around the rotor disc, the rotor blades substantially aligning with the nozzle openings; and a rotor shaft operatively coupled to the rotor disc, the rotor shaft configured to rotate when the water at the first pressure enters the housing through the inlet and passes through the nozzle openings to pass through the rotor blades and then exit through the outlet at a second pressure, wherein the second pressure is less than the first pressure.

20. The system as set forth in claim 19, further comprising rotated equipment operatively coupled to the rotor shaft.

21. The system as set forth in claim 20, wherein the rotated equipment comprises one or more of a group comprising a pump, an electrical generator, an electrical alternator and an air compressor.

22. The system as set forth in claim 20, further comprising a speed reducer operatively coupling the rotor shaft to the rotated equipment via an output shaft, wherein the output shaft rotates at a slower rotational speed than the rotor shaft.

23. The system as set forth in claim 22, wherein the speed reducer further comprises a speed sensor configured for sensing rotational speed of one or both of the rotor shaft and the output shaft, the speed sensor operatively coupled to the pressure regulator, wherein the sensed rotational speed is used in the control and operation of the pressure regulator.

24. The system as set forth in claim 19, further comprising a pressure sensor configured for sensing the third pressure, the pressure sensor operatively coupled to the pressure regulator, wherein the sensed pressure is used in the control and operation of the pressure regulator.

25. The system as set forth in claim 19, further comprising a pressure regulator disposed between the turbine and the main water line, the pressure regulator configured for receiving the water from the turbine and reducing the pressure of the water before the water passes through to the main water line.

* * * * *